(12) United States Patent  
Cooke

(10) Patent No.: US 7,568,905 B2  
(45) Date of Patent: Aug. 4, 2009

(54) ELECTRIC SERVICE LOAD MANAGEMENT

(75) Inventor: Gregory Michael Cooke, Bolton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 149 days.

(21) Appl. No.: 11/674,482

(22) Filed: Feb. 13, 2007

(65) Prior Publication Data

US 2008/0193584 A1    Aug. 14, 2008

(51) Int. Cl.
B29C 45/80    (2006.01)
(52) U.S. Cl. .................. 425/504; 425/388; 425/508
(58) Field of Classification Search .......... 425/504, 425/508, 388
See application file for complete search history.

(56) References Cited

U.S. PATENT DOCUMENTS

| | | |
|---|---|---|
| 4,031,406 A | 6/1977 | Leyde et al. |
| 4,090,088 A | 5/1978 | McMahon et al. |
| 4,506,144 A | 3/1985 | Hesford et al. |
| 4,639,609 A | 1/1987 | Floyd et al. |
| 5,210,698 A | 5/1993 | Topmiller |
| 5,581,132 A | 12/1996 | Chadwick |
| 6,705,853 B1 * | 3/2004 | Nehring .................. 425/504 |
| 2007/0010916 A1 | 1/2007 | Rodgers et al. |

FOREIGN PATENT DOCUMENTS

| | | |
|---|---|---|
| CA | 1186113 A | 4/1985 |
| WO | 2005110711 A1 | 11/2005 |

* cited by examiner

Primary Examiner—Tim Heitbrink

(57) ABSTRACT

The electric service load of a machine having at least one electric heater and at least one electric motor may be managed as follows. Where the electrical service load of the machine exceeds a threshold, which may result from transient in-rush current attendant upon start-up of an electric motor, or where this load is expected to exceed the threshold, at least one of the heaters may be de-energized. The heater may remain de-energized either for a pre-determined period of time or until the electrical service load falls below a further threshold.

9 Claims, 4 Drawing Sheets

ELECTRIC SERVICE LOAD MANAGEMENT

BACKGROUND

This invention relates to the management of electrical service loads to a machine of a molding system.

In consequence of varied operations of a machine of a molding system, the electrical service load presented by the machine may vary over time. This requires that the electrical service for the machine be designed to accommodate expected peak loading. For example, in an injection molding machine, there are typically heaters to heat the melt to a liquid state, and one or more hydraulic pump motors to close and clamp the mold halves. The electrical service for the injection molding machine must therefore be designed to accommodate peak loading when peak current demands are presented by the heaters and motors.

It would be advantageous if the electric service for a machine of a molding system could be scaled down as this would reduce the capital cost of the electrical service and reduce energy costs.

SUMMARY

The electric service load of a molding system having at least two components presenting separate electric service loads, at least one of which is subject of transients, may be managed as follows. Where the electrical service load of the system exceeds a threshold, or where this load is expected to exceed the threshold, at least one of the components is at least partially de-energized. The affected component may remain (partially) de-energized either for a pre-determined period of time or until the electrical service load falls below a further threshold.

Other features and advantages will be apparent from the following description in conjunction with the drawings.

DESCRIPTION OF THE DRAWINGS

In the figures which illustrate example embodiments of the invention.

DETAILED DESCRIPTION

Figure 1:
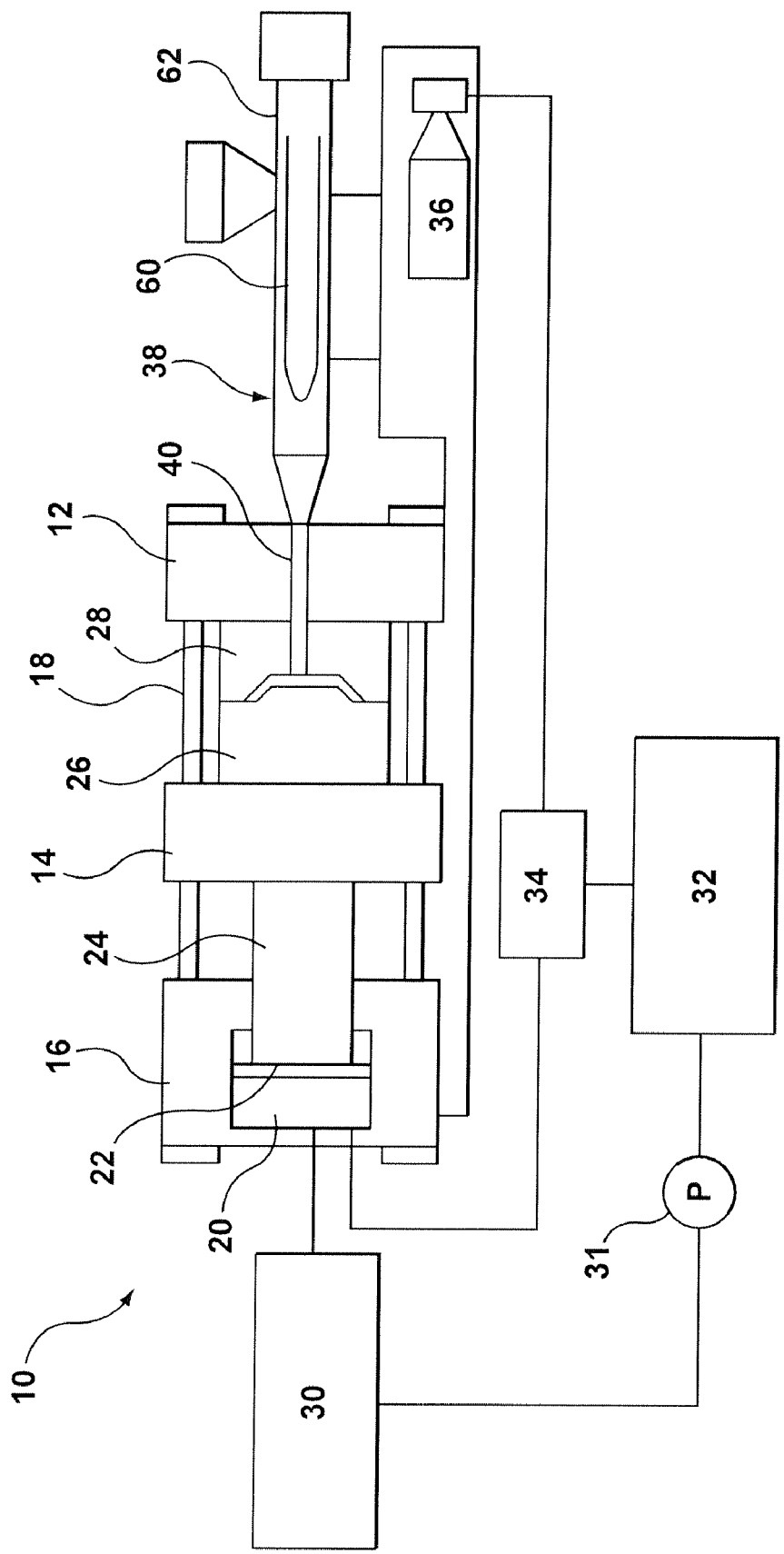
FIG. 1 is a schematic view of an injection molding machine and machine controller.

Referring now to the drawings, FIG. 1 shows an exemplary embodiment of an injection molding machine 10. The machine 10 includes a stationary platen 12, a movable platen 14 and a clamp block 16. Tiebars 18, typically four of them, connect the stationary platen 12 to the clamp block 16 and provide guidance for the movable platen 14. The clamp block 16 includes a piston-cylinder unit for applying a clamp force to the mold. The unit includes an internal clamping cylinder 20 and a reciprocating piston 22 within the cylinder 20. The piston 22 has a column 24 attached to it, which column 24 is bolted to one side of the movable platen 14. Complementary stationary hot mold half 28 and movable cold mold half 26 are mounted respectively to stationary platen 12 and movable platen 14 such that when movable platen 14 is moved to the left by applying oil pressure to the column side of the piston 22 or by alternate cylinders (not shown), the mold is opened. When the mold is in the closed position, as shown in FIG. 1, high pressure oil directed to the clamping cylinder 20 causes the mold to be clamped between the platens 12 and 14.

The cylinder 20 and piston 22 may be used as the mechanism for moving the mold halves 26 and 28 between mold closed and mold open positions. If desired, however, the cylinder 20 and piston 22 may be used solely as the mechanism for applying a clamping force and other means, such as stroke cylinders (not shown), may be used to move the mold halves between mold open and closed positions.

A pressure sensor 30 is provided to measure the actual hydraulic pressure or "clamp pressure" in the clamp cylinder 20 and to transmit a signal representative of the measured actual pressure to a machine controller 32. A pressure gauge 31 may be provided to provide a readout of the actual clamp pressure in the clamp cylinder 20. The machine controller 32 is designed to send command signals to a valve 34 to control the oil supply from an hydraulic accumulator (not shown) or an electrical pump motor 36 and thereby control the pressure of the oil in the clamping cylinder 20.

Figure 2:
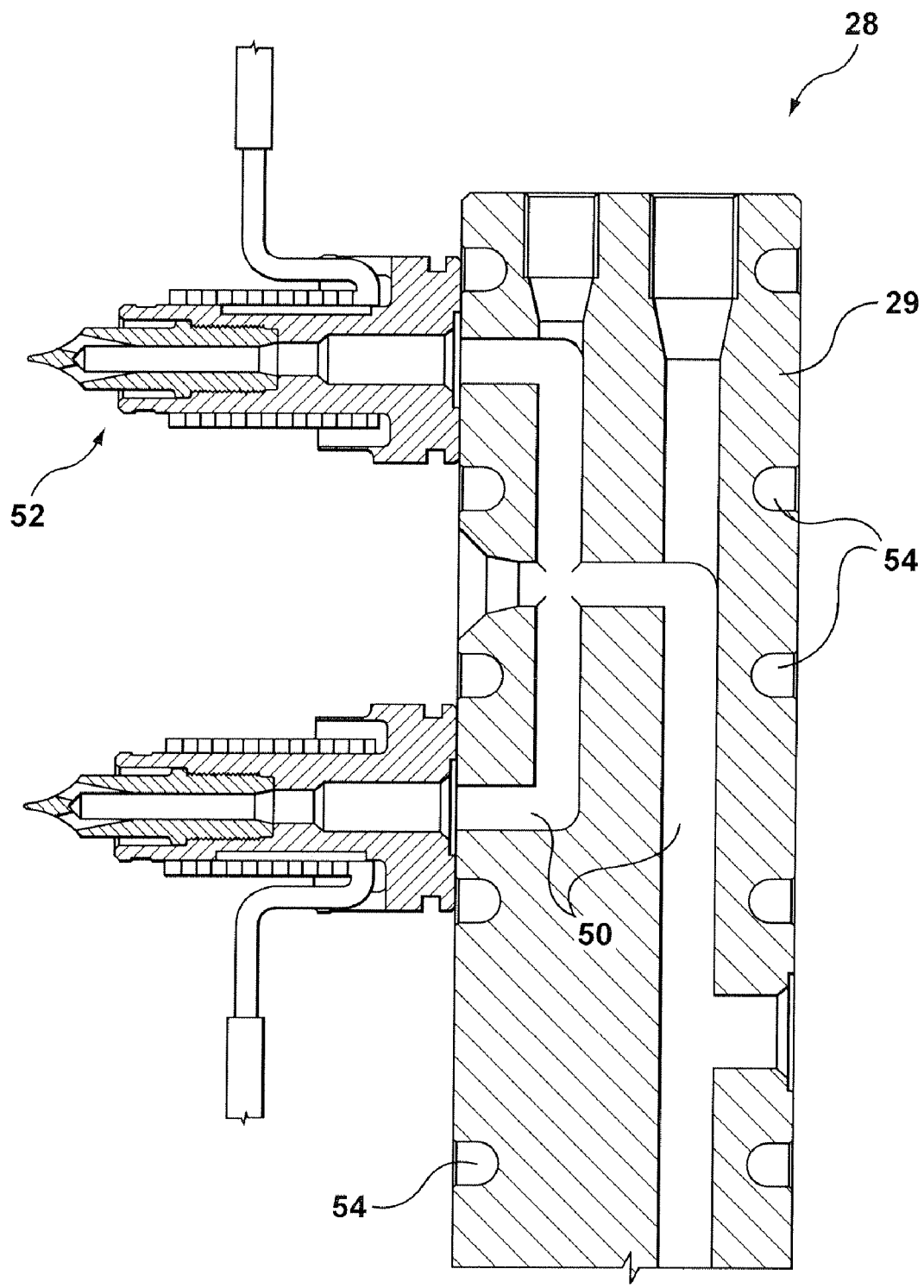
FIG. 2 is an enlarged view of a hot runner portion of a hot mold half of the machine of FIG. 1.

With reference to FIG. 2 along with FIG. 1, a hot runner portion of the mold half 28 is shown including a manifold 29 having a series of runners 50 extending from an injection unit 38 (FIG. 1) to nozzles 52 at various parts of the mold cavity for porting molding material (not shown) into the mold. Electric heating elements 54 extend about the runners 50.

The injection unit 38 may be a conventional reciprocating screw plasticizer and injection piston such that when sufficient molding material (which material may be a plastic resin or a metal alloy) has been sufficiently melted, it is injected into the mold via sprue 40. An electric heater 60 is associated with the barrel 62 of the injection unit 38.

Figure 3:
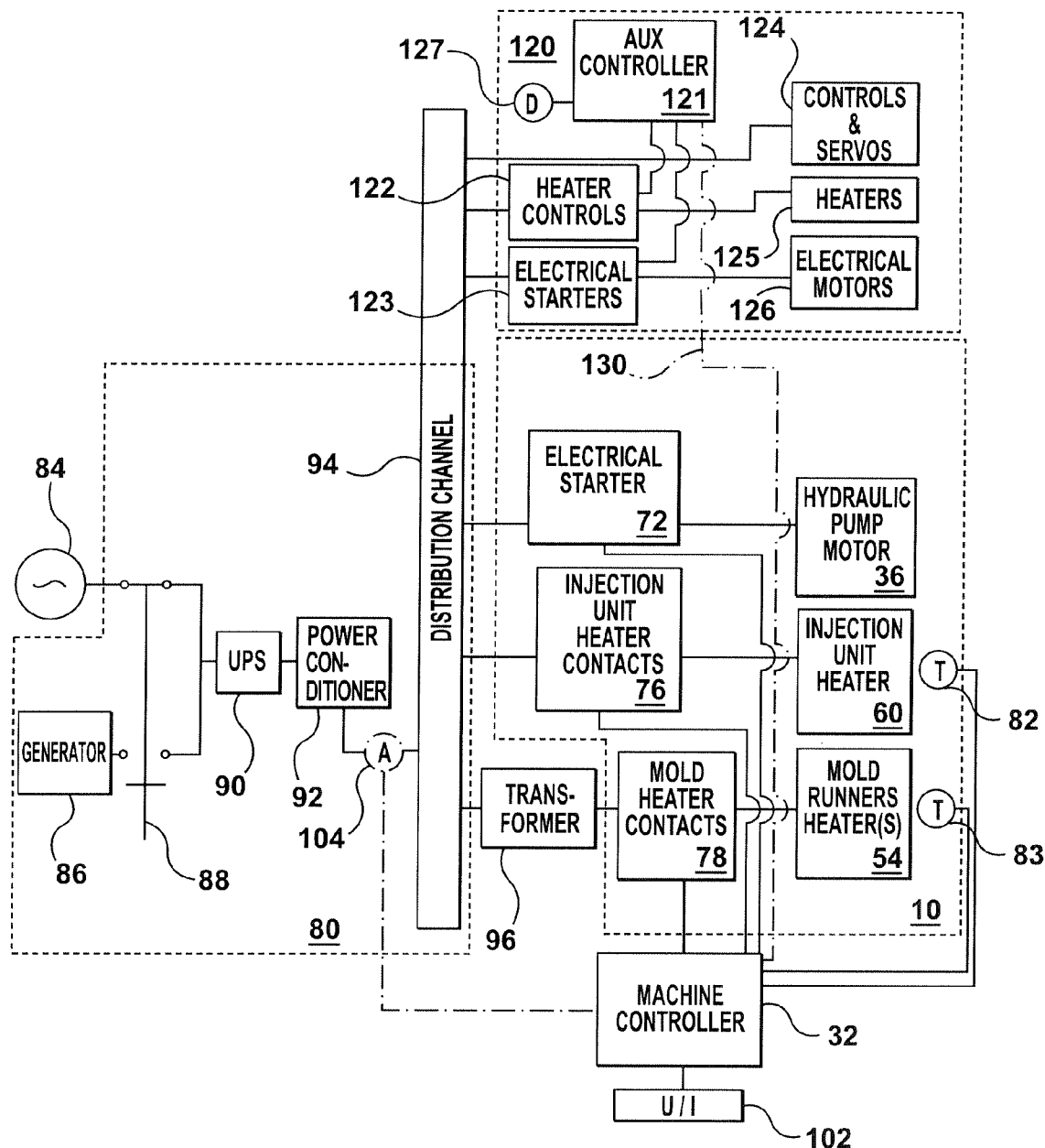
FIG. 3 is a schematic view of the injection molding machine, machine controller, auxiliary equipment, and power supply.

Turning to FIG. 3, the hydraulic pump motor 36 of the injection molding machine 10 is started with an electric starter 72. The machine 10 may also have auxiliary molding equipment 120. The auxiliary equipment 120 may include (none of which is shown), for example, a coolant chiller, a dehumidifier, a compressor, a robot, conveyor, and/or a resin dryer, and any combination or permutation thereof. The injection unit heater 60 is supplied with electrical power through contacts 76 and the mold runner heaters 54 are supplied with electrical power through contacts 78. Temperature sensors 82, 83 may be associated with the injection unit 38 (FIG. 1) and with the stationary mold half 28 (FIG. 1), respectively.

Power is supplied to the various components from an electrical service, namely main power supply 80. The main power supply may selectively connect to mains 84 or an internal generator 86 via switch 88. The output of the switch may pass through an uninterruptable power supply (UPS) 90 and a power conditioner 92 to a distribution panel 94. The distribution panel may connect, at its output side, to the electric starter 72, the injection unit heater contacts 76 and, through a transformer 96, the mold heater contacts 78. Machine controller 32 may connect to a control input of starter 72 and contacts 76, 78. A user interface 102 may be provided to the machine controller. The machine controller may receive input signals from temperature sensors 82, 83. Optionally, the machine controller may also be input with signals from an ammeter 104 or from a power meter or some other meter which indicates the electrical service load of machine 10.

Figure 4:
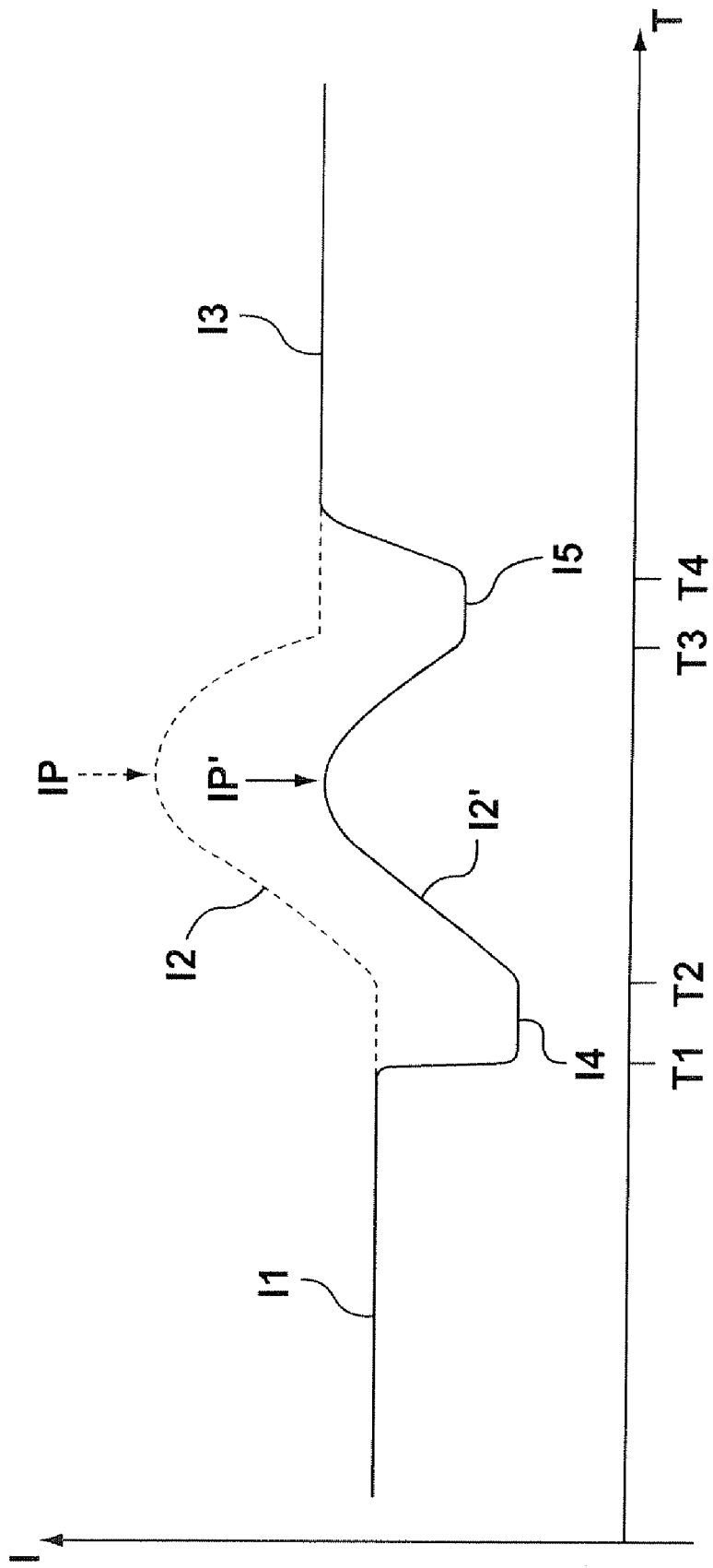
FIG. 4 is a graph of current versus time for the injection molding machine.

On start-up, switch 88 is appropriately positioned to energize the main power supply 80. The machine controller 32 may, either automatically or based on a prompt through user interface 102, close the contacts 76 and 78 in order to power the heaters 54, 60. With reference to FIG. 4, this will result in a current I1 flowing into the machine 10 from the distribution panel 94. The controller may monitor the temperature of the injection unit 38 through temperature sensor 82 and the temperature of stationary hot mold half 28 through temperature sensor 83.

In known systems, typically after the temperature of the injection unit and hot mold half have been raised toward their working temperature (temperature may be above the melting temperature of the molding material), the controller may power electric starter 72. This results in a transient in-rush current I2 to the hydraulic pump motor 36 as the motor starts-up. In FIG. 4, the hydraulic pump motor is shown as started at time T2 and the transient in-rush current I2 persists until time T3 at which a final steady-state current I3 is reached.

In accordance with one aspect of this invention, either before, or when, the machine controller executes instructions, which may be embodied in a computer readable media (not shown), to energize the hydraulic pump motor 36, at time T1, it temporarily de-energizes the injection unit heater 60 and mold runners heaters 54 by opening respective contacts 76, 78. That is, where the total current, or electrical service load, exceeds a threshold, or is expected to exceed said threshold, at least partially de-energising one or both of the heaters 54, 60. The partial de-energising of the heaters 54, 60 may be for a pre-determined period of time or until the electrical service load falls below a further threshold This causes the current supplied to the machine 10 to drop from I1 to I4. After this current drop, the controller energizes the hydraulic pump motor causing a transient in-rush current I2' which persists until time T3 at which time a steady-state current I5 is reached. Thereafter, at time T4, the controller re-energizes the heaters, by closing contacts 76, 78, resulting in the current rising to a final steady-state current of I3.

In an alternate embodiment, rather than completely de-energising the heaters 54, 60 by opening contacts, if suitable apparatus, such as a phase-angle power controller, is inserted between the power source and the heaters, the heaters may be partially de-energised.

It will be noted from FIG. 4 that the in-rush current I2 has a peak value of IP whereas the in-rush current I2' has a lower peak value of IP'. Thus, the peak current demand of machine 10 is lowered by the temporary de-energising of the heaters. The result is that the design requirements for the main power supply 80 can be relaxed. In other words, the main power supply need only be designed to handle this lower peak current demand, with a consequent reduction in the capital cost of the main power supply. Further, lowering peak demand loads can lower the energy costs of running the machine.

As will be appreciated by those skilled in the art, start-up of the hydraulic pump motor(s) of an injection molding machine is generally an infrequent event, typically resulting from maintenance, production scheduling, or component failure. However, the hydraulic pump may alternatively be operated intermittently such as with a hydraulic accumulator. Nevertheless, the main power supply must be designed to permit this start-up.

Machine controller 32 may be configured to re-energize the heaters a pre-determined time after de-energising the heaters. This pre-determined time may be selected based on the expected duration of the transient in-rush current. Alternatively, where the machine controller is input with ammeter 104 (or another meter measuring the electrical service load), the controller can directly observe the subsidence of the in-rush current and only thereafter re-energize the heaters.

The transient in-rush current typically, and not exclusively, lasts only a few seconds (e.g., three to five seconds). Therefore, the time during which the heaters 54, 60 are de-energized may also be on the order of a few seconds. This is sufficiently short that it would not be expected to have a material effect on the temperature of the injection unit 38 or the hot mold half 28. Thus, the temporary de-energising of the heaters may be expected not to degrade performance of the injection molding machine.

In some situations, a sufficient reduction in in-rush current may be achieved by temporarily de-energising only one of heaters 54 and 60.

Some or all of the operations initiated by the machine controller may be initiated consequent upon user inputs from user interface 102 rather than automatically by the machine controller. In this regard, the machine controller may provide for a manual mode of operation and an automatic mode of operation.

The teachings of this invention have application to machines with one or more electrically powered system components such as, but not exclusively, heaters and electric motors, which includes an all-electric injection molding machine (i.e. a molding machine configured with electromechanical type actuators in place of hydraulic actuators) as well as machines other than an injection molding machine such as a blow molding machine, an extrusion molding machine, and the like.

In one aspect of this invention, the machine controller may continuously monitor the electrical service load of a machine (e.g., via an ammeter) and temporarily suspend current to one or more of the heaters whenever this load exceeds a threshold. In this way other, expected or unexpected, peak loads may be reduced. In some machines, peak loading may occur at predictable points other then on start-up of a motor. In another aspect of this invention, the machine controller may temporarily suspend current to one or more of the heaters in advance of an expected peak loading event. In reducing peak load requirements, optionally power may be suspended to components in an order of priority, beginning with the least essential component.

The machine controller may be a general purpose computer adapted to operate as described by virtue of a software load in its memory.

In the exemplary embodiment of FIG. 3, the auxiliary equipment 120 is a resin dryer which includes heaters 125 controlled by heater controls 122 (such as electrical contacts or power control hardware which may include thyristors). The dryer also has air circulation blowers (not shown) motivated by electric motors 126 that are started by electric starters 123. The heater controls 122 and electric starters 123 are connected to the distribution panel 94. The resin dryer includes controls and servos 124 for the other components of the dryer as well as an auxiliary controller 121. The auxiliary controller 121 may be operatively connected to a sensor 127, the machine controller 32 (on line 130), the heater controls 122 and the electrical starters 123. The sensor 127 may be a dew point sensor, a temperature sensor, or both. In an alternative embodiment, the connections to the auxiliary controller 121 may be made instead to the machine controller and the machine controller may perform the functions that would otherwise be performed by the auxiliary controller.

A resin dryer, such as a twin tower desiccant-type, operates by sending dry air through a hopper (not shown) containing plastic resin and removes moisture from the resin. The moisture laden resin is sent through a desiccant bed (not shown) where the moisture is absorbed from the air stream by the desiccant (not shown). This air is then reheated and sent back to the hopper of resin to remove additional moisture in a closed loop. The quality of the dry air is monitored by the sensor 127 set as required for the desired degree of drying. When the moisture-absorbing capacity of the desiccant reaches its limit, the airflow is automatically switched to a second desiccant chamber (not shown) to maintain the drying process. Meanwhile, heaters 125 are used to regenerate the first desiccant chamber heating it to remove moisture and then cooling it so it can resume absorbing water.

Because the resin dryer has electric motors, these, like hydraulic pump motor 36, presents transient electrical service loads on start-up. And like the peak load presented by injection molding machine 10, the peak electrical load presented by the auxiliary equipment 120 may be reduced by temporarily suspending (or reducing) power to other components of the auxiliary equipment, such as heaters 125. Or this peak load may be reduced by temporarily suspending (or reducing) power to components of machine 10, such as heater 54 and/or heater 60, or by a combination of suspending power to both components of the auxiliary equipment and of the machine. Thus, machine controller 32 may monitor the total electrical load presented by both the auxiliary equipment and the machine (through ammeter 104) and selectively control reductions in this load in order to moderate peak demand.

Peak demand could result from events other then transients, such as where a component of a system is activated only intermittently. This invention has application to all such systems which are subject of uneven electrical power demands.

Other modifications will be apparent to those skilled in the art and, therefore, the invention is defined in the claims.

What is claimed is:

1. A molding system, comprising:
   a first electrically powered system component;
   a second electrically powered system component;
   a machine controller for monitoring an electrical service load in the molding system, and selectively controlling current to said first electrically powered system component and said second electrically powered system component, said machine controller operable to:
   energize said first electrically powered system component;
   energize said second electrically powered system component; and
   where (i) said electrical service load exceeds a threshold, or (ii) said electrical service load is expected to exceed said threshold, said machine controller de-energizes at least partially said first electrically powered system component so that said threshold is not exceeded.

2. The molding system of claim 1 wherein said machine controller configured to at least partially de-energize said first electrically powered system component either (a) for a predetermined period of time or (b) until said electrical service load falls below a further threshold.

3. The molding system of claim 1 wherein said first electrically powered system component is an electric heater and said second electrically powered system component is an electric motor.

4. The molding system of claim 1 wherein said molding system is at least one of a molding machine and an auxiliary equipment of said molding machine.

5. The molding system of claim 4 wherein said auxiliary equipment includes at least one of: a coolant chiller, a dehumidifier, a compressor, a robot, a conveyor, and/or a resin dryer, and any combination or permutation thereof.

6. The molding system of claim 4 wherein said first electrically powered system component and said second electrically powered system component are configured in said molding machine.

7. The molding system of claim 4 wherein said first electrically powered system component and said second electrically powered system component are configured in said auxiliary equipment.

8. The molding system of claim 4 wherein said first electrically powered system component is configured in one of said molding machine and said auxiliary equipment and said second electrically powered system component is configured in the other of said molding machine and said auxiliary equipment.

9. The molding system of claim 4 wherein said auxiliary equipment includes an auxiliary controller connectable to said machine controller, said auxiliary controller configured to cooperate with said machine controller for selectively controlling current to said first electrically powered system component and said second electrically powered system component.

* * * * *